Feb. 19, 1929.

A. T. KASLEY

MARINE POWER INSTALLATION

Re. 17,218

Original Filed April 25, 1927

3 Sheets-Sheet 1

WITNESSES:

E. Lutz.

INVENTOR

A.T. Kasley

BY A. B. Reavis

ATTORNEY

Feb. 19, 1929. A. T. KASLEY Re. 17,218

MARINE POWER INSTALLATION

Original Filed April 25, 1927 3 Sheets-Sheet 2

WITNESSES:
E. Lutz

INVENTOR
A.T.Kasley
BY A.B.Rivers
ATTORNEY

Feb. 19, 1929. A. T. KASLEY Re. 17,218

MARINE POWER INSTALLATION

Original Filed April 25, 1927 3 Sheets-Sheet 3

WITNESSES:
E. Lutz.

INVENTOR
A.T. Kasley

BY
A. B. Davis
ATTORNEY

Reissued Feb. 19, 1929. Re. 17,218

UNITED STATES PATENT OFFICE.

ALEXANDER T. KASLEY, OF MOORE, PENNSYLVANIA, ASSIGNOR TO WESTINGHOUSE ELECTRIC & MANUFACTURING COMPANY, A CORPORATION OF PENNSYLVANIA.

MARINE POWER INSTALLATION.

Original No. 1,667,475, dated April 24, 1928, Serial No. 186,361, filed April 25, 1927. Application for reissue filed December 22, 1928. Serial No. 328,020.

My invention relates to power developing apparatus, more particularly to marine propulsion systems, and has for its object the provision of apparatus of the character designated which is capable of developing relatively high power and which may be readily installed in a limited space in a vessel.

More specifically, the object of my invention is to provide means for transmitting power from one or more internal combustion engine units, each embodying a closed series of cylinders defining a polyhedron, to a propeller shaft in such a manner that the engines may be arranged with respect to the ship's structure so as to occupy a minimum of space.

Apparatus embodying features of my invention is illustrated in the accompanying drawings forming a part of this specification, wherein.

My invention is particularly applicable to marine installations employing internal combustion engine units having cylinders arranged to describe a polyhedron and of the type disclosed in the application of Herbert T. Herr, Serial No. 86,494, filed February 6, 1926, and assigned to the Westinghouse Elec. & Mfg. Company, although it will be apparent that it may be employed with equal facility with other types of engines. With engines of the character described in the aforesaid application, the cylinders surround the propeller shaft with the shaft disposed centrally of the polyhedral frame of the engine and power from the cylinders is transmitted to the propeller shaft through the intermediary of suitable gearing.

While such an installation is ideal from the point of view of generating and transmitting power, I have found that in marine installations, wherein the propeller shafts are inclined rearwardly and outwardly of the vessel, the dispositions of a plurality of such engines with their cylinders around the propeller shaft may take up considerable, much needed room. My invention therefore consists primarily in a system of gearing for engines of the character described whereby the point at which power is transmitted from the engine to the propeller shaft may be located in various positions with respect to the axis of the engine frame. More specifically, I transmit power from the engine cylinders to the propeller shaft through a system of gearing including idler gears, in such a manner that the major portion of the engine frame may be so located with respect to the propeller shaft as to accommodate itself to the ship's structure and thus take up a minimum of room.

Figure 1:
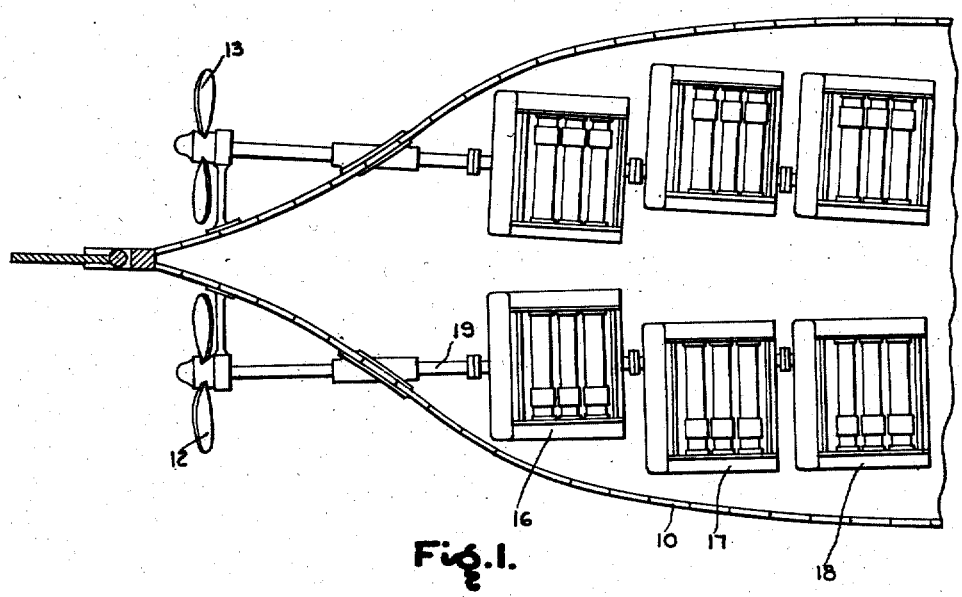
Fig. 1 is a plan view showing my improved marine propulsion system as applied to a ship.
Figure 2:
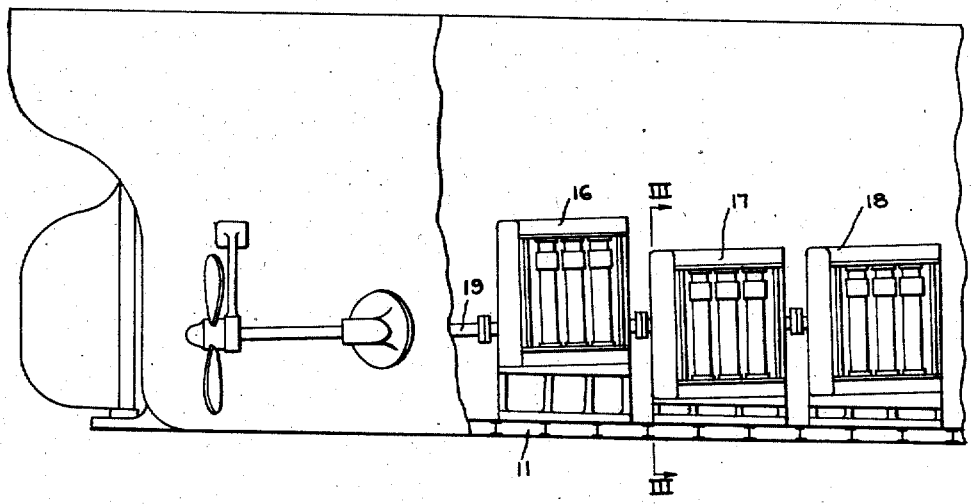
Fig. 2 is an elevational view of the apparatus shown in Fig. 1 with parts of the ship's hull broken away.

Referring now to the drawings for a better understanding of my invention. I show, in Figs. 1 and 2, a fragment of ship's structure including side structure 10 and bottom structure 11. The vessel is propelled by a pair of propellers 12 and 13, said propellers being inclined rearwardly and outwardly from the vessel. Each of the propellers is driven from a plurality of polyhedral engine units such as 16, 17 and 18, all geared to a common propeller shaft 19. It will be noted from a consideration of Figs. 1 and 2 that the engine units 16, 17 and 18, as well as the associated units driving the propeller 13 are so arranged with respect to their respective propeller shafts that they are relatively closely spaced with respect to the ship's side and bottom.

Figure 3:
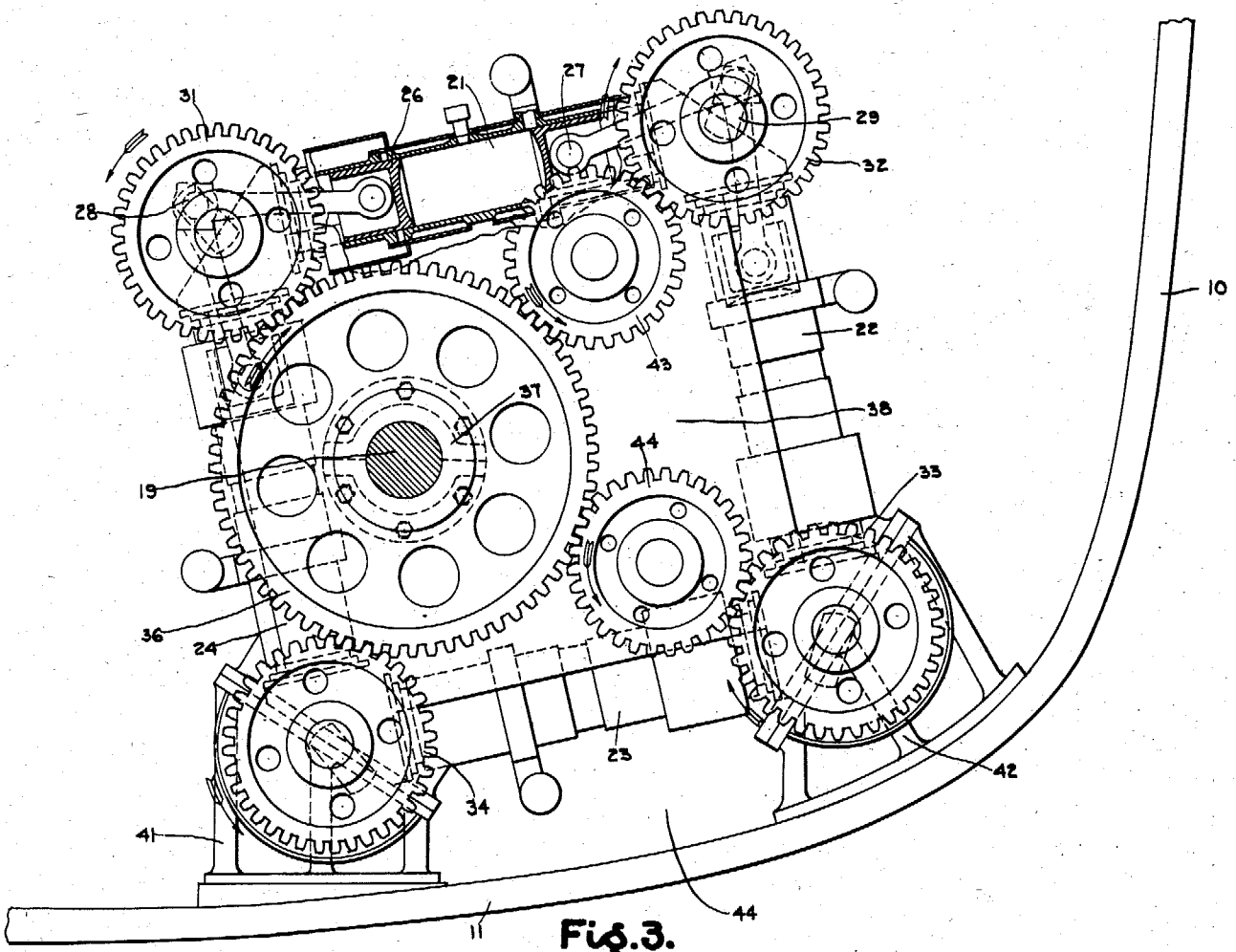
Fig. 3 is an end elevational view, partly in section, of the gearing employed with one of the engine units according to my invention.

Referring now to Fig. 3, each of the engine units comprises a closed series of similar cylinders such as 21, 22, 23 and 24. In each of the cylinders are a pair of opposed pistons such as 26 and 27. A piston of both the cylinders 24 and 26 is connected to a common crank shaft 28 and the piston 27 and a cooperating piston in the cylinder 22 are connected to a common crank shaft 29. Likewise, the pistons of the cylinder 23 are connected to crank shafts, with the remaining pistons of the cylinders 22 and 24 (not shown). It will be seen from the foregoing that the cylinders 21, 22, 23 and 24 comprise a polyhedron having crank shafts at the vertices thereof.

Connected to the crank shafts of the engine are four driving gears 31, 32, 33 and 34 which transmit power developed in the cylinders to a driven gear 36 connected to the propeller shaft 19, the propeller shaft being positioned by means of bearings 37, shown in dotted lines behind the driven gear 36, and suitably secured to a plate member 38 which is a part of the engine frame.

The propeller shaft may partly support the engine. In the example shown, the engine is at least partly supported from the ship's bottom structure as by means of suitable supports 41 and 42. It will be noted from a consideration of Fig. 3 that should the engine be so located with respect to the propeller shaft 19 that the shaft would be centrally of the engine frame axis, that the engine would occupy a position more to the left of that shown in the figure and would thus probably interfere with the positioning of the engines on the other side of the vessel. Furthermore, it would leave vacant a space near the ship's hull, toward the right of the figure, which would serve no useful purpose.

It is to overcome this peculiar difficulty that my invention is particularly directed. In order that the engine may occupy a position as close to the side and bottom structure of the vessel as may be desirable, I interpose between the driving gears 29 and 33, and the driven gear 36, a pair of idler gears 43 and 44. The power from the gears 31 and 34 is transmitted directly to the driven gear 36, while power from the gears 32 and 33 is transmitted through the idler gears 43 and 44. The effect of the idler gears 43 and 44 is to displace the engine frame with respect to the propeller shaft so that it may be more closely located with respect to the ship's side and bottom. It will furthermore be apparent from Fig. 3, that my improved gearing means permits the inclination of the engine with respect to the horizontal so that it may more readily conform to the ship's side.

Figure 4:
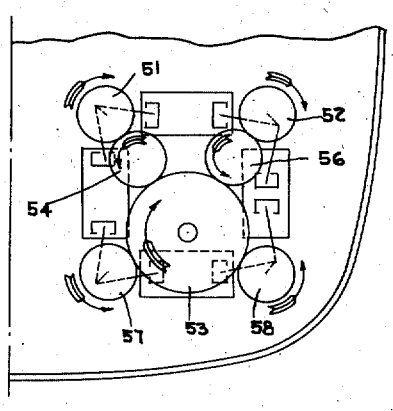
Figs. 4 and 5 are diagrammatic views showing the arrangement of gears for other positions of the engine units with respect to the ship's hull; and, Figs. 6 and 7 are diagrammatic views of the arrangement of gears according to my invention as applied to a six-sided and an eight-sided engine, respectively.

In Fig. 4, I show, diagrammatically, the arrangement of gears for the engine 16. In this view driving gears 51 and 52 transmit power to a driven gear 53 through the intermediary of a pair of idler gears 54 and 56, while driving gears 57 and 58 transmit power directly to the driven gear 53. With this arrangement, the propeller shaft is located in a position with respect to the engine frame 19, below the axis of the engine frame.

Figure 5:
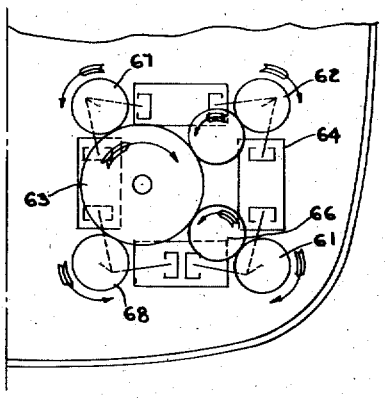

In Fig. 5, I show an arrangement of gearing for the engine, similar to that in Fig. 3, but wherein it is not necessary to tilt the engine frame in order to accommodate it to the ship's side such as is shown in Fig. 3. In this figure, driving gears 61 and 62 transmit power to a driven gear 63 through the intermediary of idler gears 64 and 66, while driving gears 67 and 68 transmit power directly to the driven gear 63. From the examples given, it will be plain that this improved gearing arrangement may be so applied to an engine of the character described in transmitting power to the propeller shaft, that the engine frame may be located in a variety of positions with respect to the propeller shaft and so to accommodate the engine structure to the space allotted.

Figure 6:
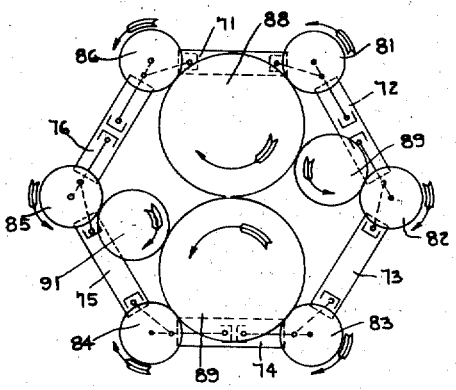

In Fig. 6, I show diagrammatically a polyhedral engine comprising a closed series of six cylinders 71, 72, 73, 74, 75 and 76. The pistons within the cylinders 71 to 76 inclusive are connected to driving gears 81, 82, 83, 84, 85 and 86, respectively. In the example shown, the driving gear 82 transmits power to a driven gear 88 through the intermediary of an idler gear 89, while the driving gears 81 and 86 mesh directly with the driven gear 88. The driving gear 85 transmits power to a driven gear 89 through the intermediary of an idler gear 91, while the driving gears 84 and 83 mesh directly with the driven gear 89, and the driven gear 89 meshes with the driven gear 88. In the arrangement of gearing such as is here shown, power may be transmitted from the engine through either of the driven gears 88 or 89 and the shaft for either of these gears may be included in the propeller shaft.

Figure 7:
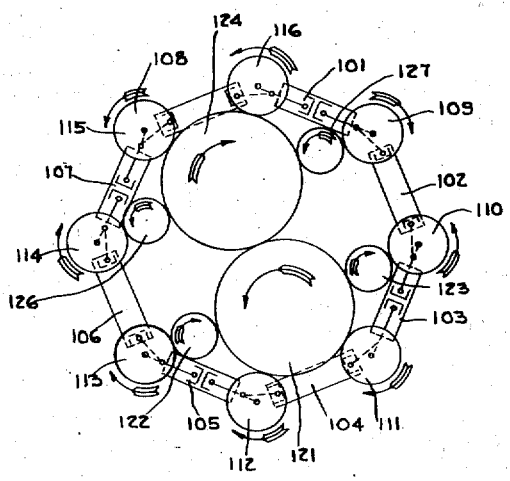

In Fig. 7, I show yet another modification of my invention wherein there is employed a polyhedral engine embodying a closed series of eight cylinders 101, 102, 103, 104, 105, 106, 107 and 108. The cylinders 101 to 108 transmit power through a series of driving gears 109, 110, 111, 112, 113, 114, 115 and 116, respectively. The driving gears 111 and 112 mesh directly with a driven gear 121 while the driving gears 110 and 113 transmit power to the driven gear 121 through the intermediary of idler gears 122 and 123. The driving gears 115 and 116 transmit power directly to a driven gear 124 which meshes with the driven gear 121, while the driving gears 114 and 109 transmit power to the driven gear 124 through the intermediary of idler gears 126 and 127. In this arrangement the power from the engine may be transmitted through either of the driven gears 121 or 124 and the propeller shaft may be located coincidental with the shaft of either of these gears. With either arrangement, it will be seen that the major portion of the engine frame will be to one side of the propeller shaft and that the engine may be so disposed in a ship's hull as to accommodate itself to the space allotted.

From the foregoing, it will be apparent that I have devised an improved marine propulsion system, whereby the power units of such systems may be the most advantageously disposed with respect to the ship's propeller shaft and the ship's structure.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a marine power installation, the combination of a propeller shaft, a polyhedral internal combustion engine unit encompassing the propeller shaft, gearing means transmitting power from the engine unit to the propeller shaft, and means for offsetting the engine unit with respect to the propeller shaft.

2. In a marine power installation, the combination of a propeller shaft, a polyhedral internal combustion engine unit encompassing the propeller shaft, gearing means for transmitting power from the engine unit to the propeller shaft, and means included in the gearing means for varying the angular relation of the engine unit with respect to the propeller shaft.

3. In a marine power installation, the combination of a propeller shaft, a polyhedral internal combustion engine unit encompassing the propeller shaft, gearing means for transmitting power from the engine unit to the propeller shaft, means included in the gearing means for varying the angular relation of the engine unit with respect to the propeller shaft, and means for supporting the engine unit on the propeller shaft and for establishing the relations of the gear means.

4. In a marine power installation, the combination of a propeller shaft, a plurality of polyhedral internal combustion engine units each encompassing the propeller shaft, gearing means for transmitting power from the engine units to the propeller shaft, and means included in the gearing means for offsetting the engine units with respect to the propeller shaft.

5. In a marine power installation, the combination of a propeller shaft, a plurality of polyhedral internal combustion engine units each encompassing the propeller shaft, and gearing means for transmitting power from the engine units to the propeller shaft, and means included in the gearing means for varying the angular relations of the engine units with respect to the propeller shaft.

6. In a marine power installation, the combination of a propeller shaft, a plurality of polyhedral internal combustion engine units each encompassing the propeller shaft, gearing means for transmitting power from the engine units to the propeller shaft, means included in the gearing means for varying the angular relations of the engine units with respect to the propeller shaft, and means for supporting each engine unit on the propeller shaft and for establishing the respective relations of the gear means.

7. In a marine power installation, the combination of a propeller shaft, a plurality of polyhedral internal combustion engine units each encompassing the propeller shaft, a driven gear on the propeller shaft, a plurality of driving gears carried by each engine unit some of which mesh with the driven gear, and idler gears interposed between the other driving gears and the driven gear.

8. In a marine power installation, the combination of a propeller shaft, a plurality of polyhedral internal combustion engine units each encompassing the propeller shaft, a driven gear on the propeller shaft, a plurality of driving gears carried by each engine unit some of which mesh with the driven gear, and idler gears interposed between the other driving gears and the driven gear, an engine frame unit extending transversely of the propeller shaft, and a bearing member carried by the engine frame unit and cooperating with the propeller shaft.

9. In a marine power installation, the combination of a propeller shaft, a plurality of polyhedral internal combustion engine units for driving the propeller shaft, said engine units each encompassing the propeller shaft, a plurality of crank shafts embodied in each engine unit, gearing means for transmitting power from each of the crank shafts to the propeller shaft, and means included in the last-mentioned means for offsetting each of the engine units with respect to the propeller shaft.

10. In a marine power installation, the combination of a propeller shaft, a plurality of polyhedral internal combustion engine units for driving the propeller shaft, said engine units each encompassing the propeller shaft, a plurality of crank shafts embodied in each engine unit, gearing means for transmitting power from each of the crank shafts to the propeller shaft, and means included in the last-mentioned means effective to offset each of the engine units with respect to the propeller shaft and with respect to each other.

11. In a marine power installation, the combination of a propeller shaft, a plurality of polyhedral internal combustion engine units for driving the propeller shaft, said engine units each encompassing the propeller shaft, a plurality of crank shafts, embodied in each engine unit, gearing means for transmitting power from each of the crank shafts to the propeller shaft, and means included in the last-mentioned means for offsetting each of the engine units with respect to the propeller shaft.

12. In a marine power installation, the combination of a propeller shaft, a plurality of polyhedral internal combustion engine units for driving the propeller shaft, said engine units each encompassing the propeller shaft, a plurality of crank shafts embodied in each engine unit, gearing means for transmitting power from each of the crank shafts to the propeller shaft, and means included in the last-mentioned means for offsetting each of the engine units with respect to the propeller shaft, and with respect to each other.

13. In a marine power installation, the combination of a propeller shaft, a plurality of polyhedral internal combustion engine units for driving the propeller shaft, said engine units each encompassing the propeller shaft, a plurality of crank shafts embodied in each engine unit, gearing means for transmitting power from each of the crank shafts to the propeller shaft, and means included in the last-mentioned means for offsetting each of the engine units with respect to the propeller shaft and with respect to each other and for varying the angular relation of the several engine units with respect to each other.

14. In a marine propulsion system, the combination of a propeller shaft, a plurality of internal combustion engine units for driving the propeller shaft, a closed series of cylinder defining a polyhedron included in each of the engines and encompassing the propeller shaft, opposed pistons in each of the cylinders, a crank shaft at each vertix of the polyhedron and connected to adjacent pistons, a driving gear carried by each of the crank shafts, a driven gear carried by the propeller shaft and meshing directly with some of the driving gears, and idler gears between the driven gear and the remaining driving gears.

15. In a marine power installation, the combination of a polyhedral internal combustion engine unit having a plurality of parallel crank shafts arranged at corners of the polyhedron, a propeller shaft arranged so that its axis intersects a polygon defined by the crank shaft axes, and gearing for transmittitng power from the crank shafts to the propeller shaft and providing for offsetting of the engine unit with respect to the propeller shaft.

16. In a marine power installation, the combination of a polyhedral internal combustion engine unit having a plurality of parallel crank shafts arranged at corners of the polyhedron, a propeller shaft having its axis so arranged that it intersects a polygon defined by the crank shaft axes, gears carried by the crank shafts, propeller shaft gear means meshing with some of said crank shaft gears, and idler gears arranged between the remaining crank shaft gears and the propeller shaft gear means.

17. In a power installation, the combination of an internal combustion engine embodying a plurality of cylinders and crank shafts defining a polygon, a driven shaft arranged so that its axis intersects the polygon, and gearing for transmitting power from the engine crank shafts to the driven shaft and providing for offsetting of the engine with respect to the driven shaft.

18. In a power installation, the combination of a driven shaft, an internal combustion engine embodying a plurality of cylinders and crank shafts defining a polygon, said polygon encompassing a portion of the driven shaft, and gearing for transmitting power from the engine crank shafts to the driven shaft and providing for offsetting of the engine with respect to the driven shaft.

In testimony whereof, I have hereunto subscribed my name this twentieth day of December, 1928.

ALEXANDER T. KASLEY.